United States Patent Office 3,301,793
Patented Jan. 31, 1967

3,301,793
PREPARATION OF FLUORIDED TUNGSTEN-NICKEL HYDROCRACKING CATALYSTS
Charles T. Adams and Stanley G. Brandenberger, Houston, and Maxwell Nager, Pasadena, Tex., assignors to Shell Oil Company, New York, N.Y., a corporation of Delaware
No Drawing. Filed Sept. 9, 1963, Ser. No. 307,320
7 Claims. (Cl. 252—441)

This invention relates to the preparation of catalyst compositions useful for carrying out hydrocarbon conversion. More particularly, the invention relates to the preparation of catalysts which are useful for carrying out the destructive hydrogenation of hydrocarbons.

Destructive hydrogenation by catalytic means, more commonly called hydrocracking, is old and well known to the art. Destructive hydrogenation of the hydrocarbon oil, usually a coal tar or a high-boiling petroleum fraction, such as gas oils or topped crude, generally is carried out at quite high temperatures and pressures of the order of 850° F. and 1500 p.s.i.g. and upward. Catalysts for the destructive hydrogenation of oils are generally a combination of hydrogenation and cracking catalysts.

While many types of catalyst compositions have been proposed for hydrocracking, it has been found that catalysts comprised of silica, alumina, tungsten and nickel are especially suitable. Catalysts of this type which also contain fluorine are particularly suitable hydrocracking catalysts. Typical catalysts comprised of the foregoing components have the following range of compositions:

| | Percent by weight |
|---|---|
| Nickel | 3–13 |
| Tungsten | 5–20 |
| Fluoride | 0.5–5 |
| Silica/alumina | 61.5–92 |

Such catalysts are well known in the hydrocracking art. However, because the commercial scale destructive hydrogenation of hydrocarbons is usually carried out at low space velocities, catalyst cost is an appreciable factor in both the initial investment and operating costs of hydrocracking plants. For this reason, there is considerable incentive to make such catalysts by the most economic method. Applicants have discovered an improved low-cost process for the preparation of fluorided tungsten-nickel on silica-alumina hydrocracking catalyst. More specifically, applicants' process is an improved process for the preparation of such catalyst by (1) impregnation on a silica-alumina catalyst base and (2) calcination of the impregnated base.

CATALYST BASE

The preferred base is predominantly silica and contains from about 50% to about 90% silica with the remainder, i.e., about 50% to 10%, alumina. A particularly preferred silica-alumina catalyst base comprises from about 70% to 90% silica and from about 30% to 10% alumina, and still more preferably from about 30% to 20% alumina.

In addition to the foregoing compositional limitations, it is important that the catalyst base have adequate pore volume, that is, a pore volume of at least 0.2 cc./g. and preferably at least 0.5 cc./g. or even 0.75 cc./g. As will be demonstrated in the examples, maintenance of high pore volume is a surprisingly important factor in minimizing and eliminating disadvantageous precipitation of salts during impregnation of the base therewith.

The silica-alumina catalyst base is preferably in the xerogel state, i.e., it is dried sufficiently to afford the usual microporous structure and therefore an appreciable available surface. It is also desirable in some cases, but not essential, to calcine the base or steam it under severe conditions to reduce its available surface somewhat as described in U.S. Patent No. 2,550,531, but it is generally not necessary to reduce the available surface to the extent indicated in this patent. On the other hand, it is also possible to use a rigid silica-alumina catalyst base which has merely been dried at a relatively low temperature, e.g., 100–120° C., and which still contains considerable amounts of water. In this latter case, however, the degree of drying must nevertheless be sufficient to remove essentially all water from the pores of the base.

The catalyst base used in the invention preferably has little or no ion exchange capacity under the impregnating conditions. Preferably, the base has essentially no ion exchange capacity at a pH below about 4.

IMPREGNATING SOLUTION

Impregnation of catalyst bases with catalytic metals and other materials is normally carried out by immersion or soaking the dry solid catalyst base in an aqueous solution of the salts of the various elements which are desired to be added to the catalyst. By this means, the pores of the catalyst are filled with salt solution. Upon subsequent severe heating (calcination), the water and volatile portions of the salts are driven off, leaving the metallic portion of the salts deposited in the pores of the catalyst. In the case of fluorided tungsten-nickel catalysts, it would be ideal to employ a single water-soluble compound containing all three components in the proper proportions. Since there is no known compound of this sort, it is necessary to use individual salts.

It is necessary, in addition, that the salts in aqueous solution be stable in the presence of silica-alumina. The preferred nickel salt in this regard is nickel nitrate which has the further advantage of being a most inexpensive nickel salt. The preferred source of tungsten is ammonium metatungstate. Both salts, of course, upon calcination are decomposed to the corresponding metal oxides.

There are at least three common fluorine compounds which are free of undesirable cations, i.e., which are free of non-volatile or non-decomposable cations. These three are hydrofluoric acid (HF), ammonium fluoride ($NH_4F$) and ammonium bifluoride ($NH_4F \cdot HF_2$). However, it has been found that in order to avoid precipitation of the above-discussed metal compounds, it is necessary to avoid the use of relatively more basic fluorine compounds in order to prevent precipitation of nickel fluoride. Likewise, it is necessary to avoid the use of relatively more acid compounds in order to prevent separation of the metatungstic acid. It is therefore preferred to use the weakly acid compound ammonium bifluoride.

The concentration of the salts in the impregnating solution is not critical as to the operability of the process, but is, of course, important as regards deposition of the desired amounts of metals into the pores of the catalyst base. Specifically, the total concentration of salts in the impregnating solution must be sufficiently high that the metals content of the pores, filled with solution, is within the aforementioned weight range.

PROCESS CONDITIONS

Even after consideration of the tendency of each of the salts to precipitate the other in aqueous solution, it has been found that both pH and the temperature of the impregnation step must be controlled within very narrow limits. More particularly, it has been found that the impregnation should be conducted within a pH range of from 1.9 to 2.9 and a temperature below 50° C. The importance of such a narrow operating range of pH and temperature is illustrated by the following example:

*Example I*

An impregnation solution was prepared by dissolving 2.55 pounds of nickel nitrate [$Ni(NO_3)_2 \cdot 6H_2O$] and 1.18 pounds of ammonium metatungstate

[$(NH_4)_6H_2W_{12}O_{40} \cdot xH_2O(85\% \ WO_3)$]

in one gallon of water. To this solution was added 0.36 pound of ammonium bifluoride ($NH_4F \cdot HF$). Eight samples of this solution were then prepared and the pH of each was adjusted to a pH value of from 1.3 to 4.3 by addition to the solution of nitric acid or ammonium hydroxide. Each of the samples of impregnating solutions was then used to impregnate a quantity of silica-alumina catalyst base (20–30% alumina, pore volume 1.3 cc./gram) at three temperature levels ranging from 25° C. to 75° C. The amount of precipitation in each impregnating system was then observed at the time intervals indicated. The results were as follows:

TABLE I
[Impregnating solution stability][1]

| Temperature | Time, hours | Sample Designation | | | | | | | |
|---|---|---|---|---|---|---|---|---|---|
| | | A | B | C | D | E | F | G | H |
| | | pH | | | | | | | |
| | | 1.3 | 1.8 | 2.1 | 2.6 | 2.9 | 3.4 | 3.9 | 4.3 |
| 25° C | 4 | 0 | 0 | 0 | 0 | 0 | 0 | 0 | 0 |
| | 20 | [2]2 | 2 | 1 | 1 | 1 | 2 | 2 | 2 |
| 50° C | 4 | 0 | 0 | 0 | 0 | 0 | 1 | 1 | 1 |
| 75° C | 0.25 | [2]2 | [2]2 | 0 | 0 | 0 | 2 | 2 | 2 |
| | 1 | [2]2 | [2]2 | 1 | 0 | 1 | 2 | 2 | 2 |
| | 2 | [2]4 | [2]4 | 2 | 1 | 2 | 3 | 3 | 3 |

[1] 0=stable, no precipitation; 1=very light precipitation; 2=light precipitation; 3=precipitation; 4=heavy precipitation.
[2] Yellow precipitate (tungstic acid) rather than pale green precipitate (nickel fluoride).

The data in Table I show quite clearly that to obtain satisfactory impregnation without precipitation of any salts, it is necessary that the solution be kept at a pH level of from about 1.9 to about 2.9, preferably at a temperature no higher than about 50° C. A solution pH of from about 2.4 to 2.7 is preferred. A pH of about 2.6 is particularly preferred. The lower temperature limit is that below which phase separation occurs such as by the separation of one or more salts because of decreased solubility or by the formation of ice crystals. As a practical matter, there is no advantage to carrying out the impregnation below normal room temperatures, i.e., about 20° C. In any event it is preferred to use an impregnation temperature of at least 10° C.

The above findings with regard to the importance of using low impregnation temperature to avoid solution instability are quite unexpected in view of the fact that the solubility of salts in aqueous solutions is related directly with temperature. Thus one would ordinarily think that such impregnations should be performed at higher temperatures to take advantage of the resultant greater solubility of the salts in the solvent.

The invention is exemplified by the following procedure.

*Example II*

An impregnation solution was prepared by dissolving 363 grams of nickel nitrate [$Ni(NO_3)_2 \cdot 6H_2O$] and 168 grams of ammonium metatungstate

[$(NH_4)_6H_2W_{12}O_{40} \cdot xH_2O(85\% \ WO_3)$]

in 600 ml. of water. To this solution 42 milliliters of concentrated nitric acid and 51 grams of ammonium bifluoride ($NH_4F \cdot HF$) were added. The solution was circulated through an ice bath to the temperature at 22–27° C. Five 45.6 gram batches of ⅛-inch silica-alumina extrudate (25–30% alumina, pore volume 1.31 cc./gram) were each dipped into the solution for three minutes. After each dip, 60 ml. of additional impregnation solution were added to the impregnation vessel to replace the volume of solution taken up by the previous batch of catalyst base. In addition, ammonium hydroxide was added to the solution to maintain the pH between 2.4 and 2.8. The thusly impregnated catalyst was then calcined at an elevated temperature to remove the water and other volatiles therefrom. The resultant catalyst contained 10% by weight tungsten, 6.0% by weight nickel and 2.5% by weight fluorine. In addition, it was observed that the concentration of the components of the impregnating solution upon completion of the impregnations was essentially the same as the original concentration.

As stated hereinbefore, pore volume of the catalyst base plays an important role in that the concentration of impregnating solution required to yield a given amount of impregnation on the base is affected directly thereby. This is illustrated by the following example.

*Example III*

Two silica-alumina (20–30% alumina, 70–80% silica) catalyst bases were selected, one having a pore volume of 0.54 cc./gram, the other 1.31 cc./gram. Several samples of each were then impregnated at room temperature by means of an impregnating solution containing nickel nitrate and ammonium metatungstate. A series of impregnating solutions containing successively greater amounts of salts were prepared and one base sample of each pore volume was impregnated therewith. It was then observed what concentration of salts was required in the impregnating solution to yield a deposition of 10% by weight tungsten and 6.5% by weight nickel on the catalyst bases. The results were as follows:

TABLE II
[Effect of pore volume on concentration of impregnating solution]

| Catalyst Base Pore Volume | Pounds of Salt per gallon of Total Impregnating Solution to Yield 10% W–6.5% Ni Catalyst | |
|---|---|---|
| | Nickel Nitrate | Ammonium Metatungstate |
| 0.54 | 6.04 | 2.78 |
| 1.31 | 2.47 | 1.14 |

These data show that the required salt concentration is inversely proportional to the pore volume of the base to be impregnated. For this reason, a pore volume of at least 0.75 cc./gram and preferably at least 1.00 cc./gram is preferred. It will, of course, be noted that the stability of the impregnating solution will consequently vary directly with the pore volume of the catalyst since stability is itself partly a function of salt concentration.

The invention is illustrated on a larger scale by the following example.

*Example IV*

Using several types of silica-alumina catalyst bases, substantial quantities of catalyst base were impregnated in accordance with the invention by dipping a one cubic foot stainless steel basket, containing the base, into a 55-gallon stainless steel drum containing impregnation solution. Each batch of catalyst was immersed from 3 to 9 minutes in the impregnation solution. Excellent stability of the impregnation solution was maintained by cooling the solution to below 50° C. throughout. In addition, the pH of the solution was maintained within the range of from 2.2 to 2.8 by addition of nitric acid. Following impregnation, the catalyst was then calcined in a commercial scale rotary kiln having a capacity in excess of 3000 pounds per hour. The inlet temperature of the kiln was 340° F. and the outlet temperature 900° F. The residence time of the catalyst in the kiln was 1.5-2.0 hours. The calcined catalysts were then analyzed to determine solution uptake and hence the chemical requirement. From 40 to 200 pounds of each catalyst was produced. The results were as follows:

TABLE III

[Semi-commercial scale preparation of tungsten-nickel fluoride on silica-alumina catalyst]

| Catalyst [1][2] | No. 1 | No. 2 | No. 3 | No. 4 |
|---|---|---|---|---|
| Form | 1/16" Extruded Pellets | | 1/8" Extruded Pellets | |
| Bulk Density, lbs./ft.$^3$ | 36.2 | | 33.1 | |
| Composition, percent by weight: | | | | |
| Nickel | 6.8 | 6.9 | 7.3 | 7.4 |
| Tungsten | 11.5 | 11.4 | 11.5 | 11.6 |
| Fluorine | [3] 2.2 | [4] 2.2 | [3] 2.8 | [4] 2.5 |
| Impregnation Time, min | 9 | | 3 | |
| Solution Adsorption, gal./lb | 0.1314 | | 0.174 | |

[1] Catalyst base: 20-30% alumina, 70-80% silica.
[2] Chemical requirements (lb./lb. of catalyst base):
  Nickel nitrate ---------------------------------- 0.4001
  Ammonium metatungstate -------------------------- 0.1852
  Ammonium bifluoride ----------------------------- 0.0559
  HNO$_3$ (56%) ----------------------------------- 0.0819
[3] Single pass through kiln.
[4] Two passes through kiln.

In order to observe the efficacy of the foregoing catalysts for hydrocracking, each was used to destructively hydrogenate cetane in a laboratory-scale processing unit. The processing conditions were as follows:

Weight hourly space velocity ---------------------- 9.6
Temperature, ° F. --------------------------------- 750
Pressure, p.s.i.g. -------------------------------- 900
Hydrogen-to-oil mol ratio ------------------------- 4.0

The liquid product was distilled in a 1-inch 30-plate Oldershaw column at 10:1 reflux. The results are shown in Table IV following:

TABLE IV

[Hydrocracking activity and selectivity]

| Catalyst No. | Conversion (100% wt. boiling above 390° F.) | Product Distribution, Percent wt. | | | |
|---|---|---|---|---|---|
| | | $C_{1-5}$ | $C_{6-13}$ | $i$-$C_{16}$ | $n$-$C_{16}$ |
| 1 | 76 | 27 | 38 | 11 | 24 |
| 2 | 77 | 30 | 40 | 7 | 23 |
| 3 | 82 | 41 | 37 | 4 | 18 |
| 4 | 84 | 44 | 36 | 4 | 16 |

The term "calcination" or "calcining," as used herein refers to the use of heat to remove essentially all the water and volatile ionic species from the catalyst base.

We claim as our invention:

1. A method for the preparation of catalysts having hydrocracking activity comprising the steps (1) impregnating a silica-alumina xerogel consisting of from about 10% to about 50% by weight alumina and from about 90 to 50% silica with an aqueous solution of the salts ammonium tungstate, ammonium bifluoride and nickel nitrate at a temperature below about 50° C. and a solution pH of from 1.9 to 2.9 and (2) calcining the impregnated xerogel, the concentration of salts in the aqueous solution being sufficient to deposit on the xerogel an amount of salts equivalent to 3-13% by weight nickel, 5-20% by weight tungsten, and 0.5-5.0% by weight fluorine, basis total weight of calcined catalyst.

2. A method for the preparation of catalysts having hydrocracking activity comprising the steps (1) impregnating a silica-alumina xerogel consisting of from about 10% to about 50% by weight alumina and from about 90% to about 50% silica having a pore volume of at least 0.5 cc. per gram with an aqueous solution of the salts ammonium tungstate, ammonium bifluoride and nickel nitrate at a temperature below about 50° C. and a solution pH of from 1.9 to 2.9 and (2) calcining the impregnated xerogel, the concentration of salts in the aqueous solution being sufficient to deposit on the xerogel an amount of said salts equivalent to 3-13% by weight nickel, 5-20% by weight tungsten, and 0.5-5.0% by weight fluorine, basis total weight of calcined catalyst.

3. A method for the preparation of catalysts having hydrocracking activity comprising the steps (1) impregnating a silica-alumina xerogel consisting of from about 10% to about 50% by weight alumina and from about 90 to 50% silica having a pore volume of at least 0.5 cc. per gram with an aqueous solution of the salts ammonium tungstate, ammonium bifluoride and nickel nitrate at a temperature below about 50° C. and a solution pH of from 2.4 to 2.7 and (2) calcining the impregnated xerogel, the concentration of salts in the aqueous solution being sufficient to deposit on the xerogel an amount of said salts equivalent to 3-13% by weight nickel, 5-20% by weight tungsten, and 0.5-5.0% by weight fluorine, basis total weight of calcined catalyst.

4. A method for the preparation of catalysts having hydrocracking activity comprising the steps (1) impregnating a silica-alumina xerogel consisting of from about 10% to about 30% by weight alumina and from about 90% to about 70% silica having a pore volume of at least 0.5 cc. per gram with an aqueous solution of the salts ammonium tungstate, ammonium bifluoride and nickel nitrate at a temperature below about 50° C. and a solution pH of from 2.4 to 2.7 and (2) calcining the impregnated xerogel, the concentration of salts in the aqueous solution being sufficient to deposit on the xerogel an amount of said salts equivalent to 3-13% by weight nickel, 5-20% by weight tungsten, and 0.5-5.0% by weight fluorine, basis total weight of calcined catalyst.

5. A method for the preparation of catalysts having hydrocracking activity comprising the steps (1) impregnating a silica-alumina xerogel consisting of from about 10% to about 30% by weight alumina and from about 90 to 70% silica having a pore volume of at least 0.75 cc. per gram with an aqueous solution of the salts ammonium tungstate, ammonium bifluoride and nickel nitrate at a temperature below about 50° C. and a solution pH of from 2.4 to 2.7 and (2) calcining the empregnated xerogel, the concentration of salts in the aqueous solution being sufficient to deposit on the xerogel an amount of said salts equivalent to 6-12% by weight nickel, 10-20% by weight tungsten, and 0.5-5.0% by weight fluorine, basis total weight of calcined catalyst.

6. A method for the preparation of catalyst having hydrocracking activity comprising the steps (1) impregnating a silica-alumina xerogel consisting of from about 20% to about 30% by weight alumina and from about 80% to about 70% silica having a pore volume of at least 0.75 cc. per gram with an aqueous solution of the salts ammonium tungstate, ammonium bifluoride and nickel nitrate at a temperature below about 50° C. and a solution pH of about 2.6 and (2) calcining the impregnated xerogel, the concentration of salts in the aqueous solution being sufficient to deposit on the xerogel an amount of said salts equivalent to 3-13% by weight nickel, 5-20% by weight tungsten, and 0.5-5.0% by weight fluorine, basis total weight of calcined catalyst.

7. A method for the preparation of catalysts having hydrocracking activity comprising the steps (1) impregnating a silica-alumina xerogel consisting essentially of from about 10% to about 50% by weight alumina and from about 90 to 50% silica, said xerogel having a pore volume of at least 0.2 cc. per gram and an ion exchange capacity of essentially zero at a pH below about 4.0, with an aqueous solution of the salts ammonium tungstate, ammonium bifluoride and nickel nitrate at a temperature of from about 10° C. to about 50° C. and a solution pH of from 1.9 to 2.9 and (2) calcining the impregnated xerogel, the concentration of salts in the aqueous solution being sufficient to deposit on the xerogel an amount of said salts equivalent to 3–13% by weight nickel, 5–20% by weight tungsten, and 0.5–5.0% by weight fluorine, basis total weight of calcined catalyst.

References Cited by the Examiner

UNITED STATES PATENTS

| | | | |
|---|---|---|---|
| 2,198,937 | 4/1940 | Frey et al. | 252—442 X |
| 2,310,278 | 2/1943 | Connolly | 252—442 X |
| 2,336,165 | 12/1943 | Connolly | 252—442 |
| 2,348,599 | 5/1944 | Brown | 252—442 |
| 2,594,706 | 4/1952 | Allan | 252—442 X |
| 3,140,925 | 7/1964 | Lindquist et al. | 252—441 |

MILTON WEISSMAN, *Primary Examiner.*

EDWARD STERN, OSCAR R. VERTIZ, *Examiners.*